United States Patent
Edmondson et al.

(10) Patent No.: US 7,323,234 B2
(45) Date of Patent: *Jan. 29, 2008

(54) CURABLE ALKANOLAMINE CONTAINING EPOXY POWDER COATING COMPOSITION

(75) Inventors: Stephen J. Edmondson, Houston, TX (US); Edward John Marx, Montgomery, TX (US)

(73) Assignee: E.I. du Pont de Nemours & Company, Wilmington, DE (US)

( * ) Notice: Subject to any disclaimer, the term of this patent is extended or adjusted under 35 U.S.C. 154(b) by 453 days.

This patent is subject to a terminal disclaimer.

(21) Appl. No.: 10/935,383

(22) Filed: Sep. 7, 2004

(65) Prior Publication Data

US 2005/0075430 A1    Apr. 7, 2005

Related U.S. Application Data

(60) Provisional application No. 60/500,415, filed on Sep. 5, 2003.

(51) Int. Cl.
*B32B 1/08* (2006.01)
*B32B 15/092* (2006.01)
*B32B 27/38* (2006.01)
*B05D 3/00* (2006.01)
*C08L 63/00* (2006.01)

(52) U.S. Cl. ............... 428/36.9; 428/416; 428/418; 427/239; 427/318; 427/327; 427/386; 427/410; 427/458; 427/470; 523/445; 523/457; 525/523

(58) Field of Classification Search ......... 428/413, 428/414, 415, 416, 417, 418, 34.1, 36.9; 427/239, 318, 327, 386, 410, 458, 470; 523/400, 523/440, 445, 457, 458; 525/523, 528
See application file for complete search history.

(56) References Cited

U.S. PATENT DOCUMENTS

| 3,988,493 | A | | 10/1976 | Yallourakis | |
|---|---|---|---|---|---|
| 4,122,060 | A | | 10/1978 | Yallourakis | |
| 4,211,691 | A | | 7/1980 | FitzGerald et al. | |
| 4,251,426 | A | | 2/1981 | McClure et al. | |
| 4,330,644 | A | | 5/1982 | Allen | |
| 4,678,712 | A | | 7/1987 | Elliott | |
| 7,001,938 | B2 | * | 2/2006 | Watkins et al. | 523/461 |
| 7,183,346 | B2 | * | 2/2007 | Edmondson | 524/405 |
| 2004/0147690 | A1 | | 7/2004 | Watkins et al. | |
| 2004/0211678 | A1 | * | 10/2004 | Edmondson | 205/730 |
| 2007/0065669 | A1 | * | 3/2007 | Edmondson et al. | 428/418 |

FOREIGN PATENT DOCUMENTS

| EP | 0 588 318 A1 | 3/1994 |
|---|---|---|
| EP | 1 070 748 A1 | 1/2001 |
| EP | 1 236 774 A2 | 9/2002 |
| JP | 55 142063 | 11/1980 |
| JP | 59 222275 | 12/1984 |
| WO | WO 00/31191 | 6/2000 |
| WO | WO 00/31193 | 6/2000 |

OTHER PUBLICATIONS

Angus Chemical Company Technical Data Sheet, "Primary Amino Alcohols", ANGUS Chemical Company, Buffalo Grove, Illinois, pp. 1-12, 2000.
International Search Report, 2005.

* cited by examiner

Primary Examiner—Michael J. Feely (57) ABSTRACT

The present invention provides a curable alkanolamine containing epoxy powder coating composition comprising at least one epoxy resin, at least one alkanolamine, a curing agent in an amount effective to cure the coating and optionally at least one zinc borate compound. Further, the present invention provides a method of cathode corrosion protection which includes the steps of subjecting a metal substrate to a mechanical treatment, applying the curable alkanolamine containing epoxy powder coating composition to the surface of the metal substrate, and polarizing the coated material as a cathode. The present invention also relates to a process for making and applying the alkanolamine containing epoxy powder coating compositions of the present invention.

21 Claims, 1 Drawing Sheet

CURABLE ALKANOLAMINE CONTAINING EPOXY POWDER COATING COMPOSITION

CROSS-REFERENCE TO RELATED APPLICATION

This application claims priority under 35 U.S.C. §119 from U.S. Provisional Application Ser. No. 60/500,415 (filed Sep. 5, 2003), which is incorporated by reference herein as if fully set forth.

FIELD OF THE INVENTION

The present invention is directed to a curable alkanolamine containing epoxy powder coating composition for use in both functional and decorative applications. In particular, this invention is directed to a curable epoxy powder coating composition having improved adhesion to a substrate under hot and humid conditions. This invention also relates to a powder coating having improved resistance to cathodic disbandment, such that the adhesion of the alkanolamine containing epoxy powder coating composition of the present invention to the substrate is improved.

BACKGROUND OF THE INVENTION

Due to their physical and chemical properties, such as high resistance to chemical attack and good adhesion to various substrates, epoxy resins are useful in the preparation of powder coatings. Conventionally, an epoxy powder coating binder system is prepared by blending an epoxy resin with a coreactant, such as a compound that contains either one or more reactive phenolic hydroxyl groups, or one or more reactive amine groups that are capable of reacting with the epoxide groups to form a hard, infusible coating. This epoxy powder coating binder system can then be combined with other additives such as, additional curing agents, pigments, flow control agents, etc. to form a suitable epoxy powder coating composition for coating metallic substrates.

Generally, the adhesion of epoxy powder coating compositions to the substrate is adequate. However, adhesion of the presently available epoxy powder coating compositions to metallic substrates under hot and humid conditions continues to be a problem. This is especially true of the epoxy powder coating compositions presently available for coating rebars and the interior and exterior of pipes.

U.S. Pat. No. 4,678,712 to Elliot and U.S. Pat. No. 4,330,644 to Allen disclose various rebar and pipe epoxy powder coating compositions that have the epoxy resin pre-reacted with a hydroxylamine to form an epoxy-amine adduct prior to being added to the powder pre-mix. However, such powder coatings still suffer from poor humidity resistance.

Epoxy powder coatings have also been used in the past on gas and oil pipelines to prevent corrosion, as well as, facilitate cathodic protection of the pipe. Cathodic protection is another means for preventing corrosion of iron containing metallic materials, such as steel in humid conditions containing electrolytes, i.e., brine and salt solutions. In general, cathodic protection prevents dissolution of the iron containing metallic material by maintaining the material as a cathode and inhibiting ionization of the iron contained therein. The iron containing metallic material, however, is generally not used by itself to provide cathodic protection because when the iron portion has a large area the consumption of power and a sacrificial anode increases. Instead, cathodic protection is generally effected by applying an organic coating and/or lining to the iron containing metallic material. Through this approach, the majority of the iron containing metallic material is protected from corrosion, and any corrosion that might arise as a result of defective portions occurring in the organic coating and/or lining, such as scratches and/or pin-holes, can be supplementally prevented through cathodic protection.

Unfortunately, it is extremely difficult to predict the exact size of the surface area at risk, and therefore excessive amounts of power and cathodic protection end up being applied to the iron containing metallic material. When excessive cathodic protection is applied, however, there is excessive polarization, which causes hydroxyl ions to be generated via hydrolysis of water at the cathode. As a result, the metal exposed at the scratched portions of the organic coating ends up functioning as a cathode, and the organic coating is therefore always exposed to an alkaline environment. Eventually, these conditions cause the points of adhesion of the organic coating and/or lining to degrade at the interface between the metallic material and the organic coating, as well as, between the organic coatings, particularly at the points where alkali resistance is weakest. As a result, cathodic disbonding of the organic coating occurs.

As a means for restricting such cathodic disbanding, Japanese Unexamined Patent Publication (Kokai) No. 59-222275 proposes using either a chromate treatment method, or a zinc-rich primer coating of a specific thermosetting epoxide resin, and Japanese Unexamined Patent Publication (Kokai) No. 55-142063 proposes using a composition consisting of a polyvinyl butyral resin, a liquid epoxide resin, a borate compound, an epoxy-silane coupling agent and phosphoric acid as a pre-treatment composition for baking type.

In addition, European Patent No. 0 588 318 B1 to Kaga mentions a method for providing cathodic protection that involves using steel pre-treatment steps, applying a thermosetting epoxide resin based powder coating containing 5 to 75 wt. % zinc compounds, and subsequently polarizing the coated steel material as a cathode. Using high levels of zinc compounds, however, presents issues of solubility over long periods of time, as well as, as increased costs due to the high price of zinc borate compounds.

Accordingly, there is a need for powder coating compositions, and methods of application thereof, that provide optimum short and long term high temperature and humidity cathodic disbondment protection at a lower cost. There is also a need for powder coating compositions, and methods of application thereof, that provide improved adhesion to a substrate under hot and humid conditions, which can be applied at lower temperatures, and therefore at lower energy consumption costs.

SUMMARY OF THE INVENTION

The present invention concerns a first epoxy powder coating composition comprising an intimate mixture of:
(a) at least one epoxy resin;
(b) about 0.02 to about 6.0 wt. %, based on total weight of the powder coating composition, of at least one alkanolamine; and
(c) at least one epoxy curing agent in an effective amount to cure said powder coating composition;
  wherein components (a), (b) and (c) are not reacted prior to being mixed together.

This invention also relates to a second epoxy powder coating composition, wherein the first epoxy powder coating composition further comprises from about 0.5 to 4.75% by weight, based upon total solids weight, of at least one zinc borate compound.

This invention further relates to a method of cathodic corrosion protection for a steel material having at least one surface comprising subjecting the surface of the steel material to a mechanical treatment, applying the first or second epoxy powder coating composition to the surface of the steel material, and polarizing the coated material as a cathode.

This invention also relates to a metal substrate having the first or second epoxy powder coating composition coated thereon.

This invention also relates to a first process of making the first powder coating composition of the present invention comprising
(a) adding at least one epoxy resin to a mixing container;
(b) adding about 0.02 to about 6.0 wt. %, based on total weight of the powder coating composition, of at least one alkanolamine to the mixing container;
(c) adding at least one epoxy curing agent in an effective amount to cure a powder coating to the mixing container; and
(d) mixing components (a), (b) and (c) together, wherein said components (a), (b) and (c) are not reacted prior to being added to the mixing container.

This invention further relates to a second process of making the second powder coating composition of the present invention comprising
(a) adding at least one epoxy resin to a mixing container;
(b) adding about 0.02 to about 6.0 wt. %, based on total weight of the powder coating composition, of at least one alkanolamine to the mixing container;
(c) adding about 0.5 to about 4.75 wt. %, based on total weight of the powder coating composition, of at least one zinc borate compound;
(d) adding at least one epoxy curing agent in an effective amount to cure a powder coating to the mixing container; and
(e) mixing components (a), (b) (c) and (d) together, wherein said components (a), (b), (c) and (d) are not reacted prior to being added to the mixing container.

Finally, this invention relates to a process for coating a metal substrate with the first or second powder coating composition comprising applying the first or second powder coating composition to a metal substrate and curing said powder coating composition.

DETAILED DESCRIPTION OF THE INVENTION

All patents, patent applications, and publications referred to herein are incorporated by reference in their entirety.

Further, when an amount, concentration, or other value or parameter is given as a list of upper preferable values and lower preferable values, this is to be understood as specifically disclosing all ranges formed from any pair of an upper preferred value and a lower preferred value, regardless of whether ranges are separately disclosed.

The present invention is based on the discovery that an epoxy powder coating composition containing at least one epoxy resin, low levels (additive quantities) of at least one alkanolamine, and an effective amount of an epoxy curing agent to cure the coating composition, wherein the alkanolamine, the epoxy resin, and the epoxy curing agent are mixed together without pre-reacting the alkanolamine with either the epoxy resin, or the epoxy curing agent, will produce a coating having excellent adhesion in hot and humid conditions, as well as, excellent resistance to cathodic disbanding, especially in short term high temperature and humidity conditions.

The present invention is also based on the discovery that an epoxy powder coating composition containing at least one epoxy resin, low levels (additive quantities) of at least one alkanolamine, low levels (additive quantities) of a zinc borate compound, and an effective amount of an epoxy curing agent to cure the coating composition, wherein the epoxy resin, the alkanolamine, the zinc borate compound and the epoxy curing agent are mixed together without pre-reacting the alkanolamine with either the epoxy resin, or the epoxy curing agent, will produce a coating having excellent resistance to cathodic disbanding in both long and short term high temperature and humidity conditions.

In comparison to conventional epoxy coatings, the coatings prepared in accordance with the present invention also exhibit improved adhesion when applied to metal surfaces that have been subjected to less than ideal surface preparation. Metal surfaces that have been less than ideally prepared include, for example, a steel surface that has been blasted but not acid rinsed, a steel surface that has been pre-heated to a lower than normal application temperature, and a steel surface that has been cleaned but not chemically pre-treated.

The coating compositions of the present invention not only exhibit improved adhesion, but the improved adhesion is realized at lower application temperatures than the application temperatures of presently available powder coating compositions that have been viewed as having good adhesion. Indeed, good adhesion has previously been obtained by applying the coating composition at temperatures of over 230° C. (448° F.). As a result, the coating compositions of the present invention can provide significant energy savings, and therefore costs.

Epoxy Resin

In general, the epoxy resins that may be used in accordance with the present invention include any epoxy resin, or mixtures thereof, that are capable of firmly adhering to metallic materials, including metallic materials subjected to a mechanical treatment, such as blast cleaning, or to chemical treatments, such as a chromate treatment or treatment with zinc phosphate. Examples of such resins include di-glycidyl ethers of 4,4-(bishydroxyphenyl)alkanes, phenol novolac epoxy functional resins, cresol novolac epoxy functional resins, bisphenol-A/epichlorohydrin epoxy functional resins, or mixtures thereof. Preferably, the epoxy resin is a phenol novolac epoxy functional resin, a bisphenol-A/epichlorohydrin epoxy functional resin, or a mixture thereof.

The di-glycidyl ethers of 4,4-(bishydroxyphenyl) alkanes of the present invention can be prepared by reacting 4,4'-(bishydroxyphenyl) alkanes, such as bisphenol A, bisphenol F, etc., with epichlorohydrin. There is no problem in using di-glycidyl ethers of 4,4-(bishydroxyphenyl) alkanes as the principal component in combination with phenol novolac epoxy resins, cresol novolac epoxy resins, or other multi-functional resins. A person of ordinary skill in the art is familiar with the commercially available di-glycidyl ethers of 4,4-(bishydroxyphenyl) alkane resins that can be used in accordance with the invention. For example, di-glycidyl ethers of 4,4-(bishydroxyphenyl) alkanes are marketed under the names EPON® and EPIKOTE™ by Resolution Performance Products, LLC, under the name EPO TOHTO™ by Tohto Kasei K. K., under the name ARALDITE® by Vantico, Inc., and under the name EPI-CLON® by Dainippon Ink & Chemicals, Inc.

The phenol novolac epoxy functional resins of the present invention can be prepared by reacting phenol novolac resins with epichlorohydrin. In some cases, epoxy phenolic novolac resins are blended with standard bisphenol-A epoxy resins. A person of ordinary skill in the art is familiar with the commercially available phenol novolac epoxy functional resins that can be used in accordance with the invention. For example, phenol novolac epoxy functional resins are marketed under the name D.E.R.™ by Dow Chemical Co., such as, for example, D.E.R.™ 672U and D.E.R.™ 642U.

The cresol novolac epoxy functional resins of the present invention can be prepared by reacting a cresylic novolac resin with epichlorohydrin. A person of ordinary skill in the art is familiar with the commercially available cresol novolac epoxy functional resins that can be used in accordance with the invention. For example, cresol novolac epoxy functional resins are marketed under the name EPON® by Resolution Performance Products, LLC, such as, for example, EPON® resin 164.

The bisphenol-A/epichlorohydrin epoxy functional resins of the present invention can be prepared by reacting bisphenol-A with epichlorohydrin. A person of ordinary skill in the art is familiar with the commercially available bisphenol-A/epichlorohydrin epoxy functional resins that can be used in accordance with the invention. For example, bisphenol-A/epichlorohydrin epoxy functional resins are marketed under the name EPON® by Resolution Performance Products, LLC, such as, for example, EPON® Resin 2024, and under the name 214 CR by Kudko.

Preferably, the coating compositions of the present invention contain from about 25 to about 90% by weight, based on total weight of the coating composition, of an epoxy resin, or mixtures thereof. More preferably, the compositions contain about 60 to about 80% by weight, based upon total weight of the coating composition, of an epoxy resin, or mixtures thereof.

Preferably, the epoxy resin is a solid epoxy resin selected from bisphenol-A/epichlorohydrin epoxy functional resins, novolac modified epoxy functional resins, and mixtures thereof. Most preferably, the solid epoxy resin is EPON® Resin 2024.

Alkanolamine

In general, the alkanolamines that may be used in accordance with the invention include, but are not limited to, those having the following formulas:

A where $R_1$ is a linear or branched alkyl group of 1 to 10 carbons, preferably 2 to 8 carbons, and more preferably 2 to 4 carbons that contains at least one primary hydroxyl group; and

B where $R_1$ is a linear or branched alkyl group of 1 to 10 carbons, preferably 2 to 8 carbons, and more preferably 2 to 4 carbons, or a linear or branched alkyl group of 1 to 10 carbons, preferably 2 to 8 carbons, and more preferably 2 to 4 carbons that contains at least one primary hydroxyl group and $R_2$ is a linear or branched alkyl group of 1 to 10 carbons, preferably 2 to 8 carbons, and more preferably 2 to 4 carbons that contains at least one primary hydroxyl group.

The alkanolamines used in accordance with the present invention can be in either liquid, or solid form. A person of ordinary skill in the art is familiar with the techniques that can be utilized to incorporate liquid alkanolamines into the powder mixture. For example, prior to adding the liquid alkanolamine to the powder coating mixture of the present invention, the liquid alkanolamine can be absorbed onto an inert carrier, such as silica.

Preferably, the alkanolamines of the present invention include, but are not limited to diethanolamines, ethanolamines, 2-amino-1-butanol, 2-amino-2-methyl-1-propanols, 2-amino-2-ethyl-1,3-propanediols, tris(hydroxymethyl)aminomethanes, 2-amino-2-methyl-1,3-propanediols, monomethylaminoethanols, isopropylaminoethanols, t-butylaminoethanols, ethylaminoethanols, n-butylaminoethanols, isopropanolamines, diisopropanolamines, and mixtures thereof. More preferably, the alkanolamines of the present invention are d iethanolamines, tris(hydroxymethyl)aminomethanes, and mixtures thereof. Most preferably, the alkanolamines are tris(hydroxymethyl)aminomethanes.

A person of ordinary skill in the art is familiar with the commercially available alkanolamines that can be used in accordance with this invention. For example, the tris(hydroxymethyl)aminomethanes are marketed under the name TRIS AMINO® by Dow Chemical Co.; the diethanolamines are marketed under the name diethanolamine by Aldrich Chemical Co., Inc.; the 2-amino-2-methyl-1,3-propanediols are marketed under the name AMPD™ by the Dow Chemical Co.; the 2-amino-1-butanols are marketed under the name AB® by the Dow Chemical Co.; the 2-amino-2-methyl-1-propanols are marketed under the name AMP by Dow Chemical Co.; and the 2-amino-2-ethyl-1,3-propanediols are marketed under the name AEPD® by Dow Chemical Co.

Preferably, the coating compositions of the present invention contain from about 0.02 to about 6.0% by weight, based on total weight of the coating composition, of an alkanolamine, or mixtures thereof. More preferably, the compositions contain from about 0.1 to about 3.0% by weight, based on total weight of the coating composition, of an alkanolamine, or mixtures thereof. Even more preferably, the compositions contain from about 0.1 to about 0.5% by weight, based on total weight of the coating composition, of an alkanolamine, or mixtures thereof. Most preferably, the compositions contain about 0.3% by weight, based on total weight of the coating composition, of an alkanolamine, or mixtures thereof.

Not wishing to be bound by theory, Applicants believe that adding an alkanolamine to an epoxy powder coating composition in accordance with the present invention produces good short term cathodic disbandment results;

whereas further adding a zinc borate compound to the coating composition in accordance with the present invention produces good long term cathodic disbondment results. Applicants also further believe that adding the alkanolamine to the coating composition at the same time the other components are added without first pre-reacting the alkanolamine with either the epoxy resin, or the curing agent, not only enables the amount of alkanolamine added to be better controlled, but also improves 1) the adhesion of the alkanolamine containing epoxy powder coating composition to the substrate under hot and humid conditions, as well as, 2) the resistance of the alkanolamine containing epoxy powder coating composition to cathodic disbandment, such that the adhesion of the alkanolamine containing epoxy powder coating composition to the substrate is improved.

Epoxy Curing Agent

The epoxy curing agent, or mixtures thereof, that may be used in accordance with the present invention include, but are not limited to amines, such as aromatic amines; acid anhydrides; acids; aromatic acids; mercaptans; phenolics; accelerated and/or modified dicyandiamides having addition reactivity and self-polyaddition catalytic activity between epoxy groups and the derviatives thereof; imidazoles; imidazole adducts; hydrazides and so forth. Preferably, the epoxy curing agent is a dicyandiamide functional epoxy curing compound, such as Epicure™ Curing Agent P-104 by Resolution Performance Products, LLC, or a phenolic functional epoxy curing compound, such as Durite® SD 357B by Borden Chemicals, Inc., or a mixture thereof. More preferably, the epoxy curing agent is a phenolic functional epoxy curing compound having a functionality greater than two. Most preferably, the epoxy curing agent is tetra phenol ethane.

The curing agent is incorporated into the coating compositions of the present invention in an amount effective to cure the coating. Preferably the coating composition contains from about 0.5 to about 35% by weight, based on total weight of the coating composition, of a curing agent, or mixtures thereof. More preferably, the composition contains from about 1.5 to about 20% by weight, based on total weight of the coating composition, of a curing agent, or mixtures thereof. Most preferably, the composition contains from about 1.5 to about 6.0% by weight, based on total weight of the coating composition, of a curing agent, or mixtures thereof.

A person of ordinary skill in the art is familiar with the commercially available curing agents that can be used in accordance with this invention. For example, various amine adducts are marketed under the names SUNMIDE by Sanwa Chemical Industry Co. Ltd. and EPICURE™ by Resolution Performance Products, LLC; various acid anhydrides are marketed under the name RIKASHIDE by New Japan Chemical Co., Ltd.; and various phenolics are marketed under the name DURITE® by Borden Chemical Co, such as for example, Durite® SD 357B and under the name D.E.H.™ by Dow Chemical Company, such as, for example, D.E.H.™ 84.

A person of ordinary skill in the art will know which epoxy resin curing agent to select based on the formulation of the coating composition, the curing conditions, and so forth. A particularly useful epoxy curing agent is Resolution Performance Products' EPICURE P-104™.

The ratio of the curing agent to reactive resin component of the coating composition is preferably (0.5-1.1)/1.0, more preferably (0.7-0.9)/1.0, in terms of the equivalent ratio of the reactive group of the curing agent and the epoxy functional groups capable of reacting with the reactive group of the curing agent.

A person of ordinary skill in the art is also familiar with the circumstances that require a catalyst to be further added to the coating composition of the present invention. For example, when tetra phenol ethane is the only curing agent used, it may be necessary to add a catalyst. The catalysts useful in the present invention are more clearly set forth hereinbelow.

Zinc Borate Compound

The coating compositions of the present invention can further comprise a zinc borate compound. Zinc borate compounds useful in accordance with the present invention included, but are not limited to, zinc metaborate [$Zn(BO_2)_2$], basic zinc borate [$ZnB_4O_7.2ZnO$], zinc borate [$2ZnO \cdot 3B_2O_3.3.5H_2O$], or mixtures thereof. Preferably, the zinc borate compound is zinc borate [$2ZnO \cdot 3B_2O_3.3.5H_2O$].

Zinc borate can be prepared by melting a mixed starting material of zinc oxide and boric acid or double-decomposing the aqueous solution of the mixed starting material. A particularly useful zinc borate compound is "Borogard ZB fine," [$2ZnO \cdot 3B_2O_3.3.5H_2O$], available from U.S. Borax, Inc.

The coating composition of the present invention contains below 5% by weight, based on total weight of the powder coating composition, of zinc borate compound. Preferably, the coating composition contains from about 0.5 to about 4.75 wt. %, more preferably from about 0.5 to about 4.0 wt. %, and most preferably from about 1.5 to 2.5 wt. %, based on total weight of the powder coating composition, of a zinc borate compound. By only requiring small amounts of the zinc borate compound to be added, issues relating to zinc borate solubility do not pose a problem as solubility of the zinc borate compound improves when low levels of the compound are used.

Other Additives

The coating compositions of the present invention may further comprise one or more additives including, but not limited to, pigments, dyes, fillers, flow control agents, dispersants, thixotropic agents, adhesion promoters, antioxidants, light stabilizers, thermoplastic polymers, curing catalysts, other anticorrosion agents and mixtures thereof. The other anticorrosion agents include, but are not limited to, anticorrosion pigments, such as phosphate containing pigments; and other organic or inorganic corrosion inhibitors, such as, for example, salts of nitroisophthalic acid, phosphoric esters, technical-grade amines and substituted benzotriazoles.

Catalysts suitable for use in the present invention include those that are capable of affecting a reaction between the epoxy group of the epoxy resin, the amine hydrogens of the amine functional curing agents, the phenolic hydroxyl groups of the phenolic compounds and homopolymerization of the epoxy resin. These catalysts include, but are not limited to, the onium compounds, such as the phosphonium and quaternary ammonium salts of organic and inorganic acids; imidazoles; imidazolines; and tertiary amines and phosphines.

Preferably, the catalyst used is a solid at room temperature, and is selected from imidazoles, such as 2-styrylimidazole, 1-benzyl-2-methylimidazole, 2-methylimidazole, 2-butylimidazole and mixtures thereof and the solid phosphines, such as triphenyl phosphine and phosphonium salts of an acid, acid ester or ester. More preferably, the catalyst used is either an epoxy adduct of an imidazole, or a substituted imidazole compound. Sometimes, it is desirable to use a mixture of an amino-containing compound, such as an adduct of an imidazole compound and an epoxy resin in combination with a dicyandiamide curing agent.

The catalyst is incorporated into the coating compositions of the present invention in an amount effective to initiate curing of the coating. A person of ordinary skill in the art will know, based on the components utilized in formulating the coating compositions of the present invention, the amount of catalyst that should be added so as to be effective in initiating the curing process.

A person of ordinary skill in the art will also recognize the circumstances in which adding a catalyst to the composition of the present invention is either beneficial, or necessary. For example, when tetra phenol ethane is the only curing agent used, it may be necessary to add a catalyst.

A person of ordinary skill in the art will further recognize that some curing agents, such as Epicure™ Curing Agent P-101 by Resolution Performance Products, LLC can act as both a curing agent and as a catalyst.

Pigments useful in the present invention include, but are not limited to, titanium dioxide, iron oxide, aluminum bronze, phthalocyanine blue, phthalocyanine green and mixtures thereof.

Fillers useful in the present invention, include but are not limited to, talc, alumina, calcium oxide, calcium silicate, calcium metasilicate, barium sulfate, aluminum silicate, barytes, mica, silica, and mixtures thereof.

Flow control agents and thixotropic agents are based, for example, on modified bentonites or silicas.

Thermoplastic polymers useful in the present invention include, but are not limited to, an acrylinotrile/butadiene based compound that is available, for example, as Zealloy® 1422 from Zeon Chemical.

Preferably the coating composition of the present invention contains from 0 to about 55% by weight, more preferably from about 5 to about 35% by weight, based on total weight of the powder coating composition, of fillers, pigments, additives, or mixtures thereof.

Metallic Substrate

The compositions of the present invention can be used to coat many metallic substrates including, but not limited to, steel, brass, aluminum, chrome, and mixtures thereof. More particularly, the compositions of the present invention are useful for coating metal substrates that include for example, but are not limited to, the internal and/or external surfaces of steel pipes; the structural steel used in concrete; storage tanks; valves; structural steel used in marine environments; and oil production tubing and casings. Preferably, the structural steel coated is a rebar. The compositions of the present invention can also be used to coat iron containing metallic substrates, such as steel, when such substrates are subjected to the method of cathodic protection in accordance with the present invention.

Process for Preparing

In general, the components of the present invention are mixed, extruded and ground in accordance with processes familiar to a person of ordinary skill in the art. The only limitation being that the alkanolamine is not reacted with either the curing agent or the epoxy resin prior to being combined with any of the additional powder coating components. In addition, although the alkanolamine is generally not pre-blended with the other powder coating components, it is believed that the superior performance properties of the powder coating of the invention will not be affected by such pre-blending as long as the alkanolamine does not react with the component(s) with which the alkanolamine is being pre-blended. In sum, pre-blending the alkanolamine with the other powder coating components is believed to be acceptable as long as the alkanolamine is not permitted to react with any of the components with which the alkanolamine is being pre-blended.

In a preferred embodiment, the curable coating composition is a powder coating composition prepared by conventional techniques employed in the powder coatings art. Typically, all of the components of the present powder coating formulation are added to a mixing container that is properly sized to accommodate the formulation, and then thoroughly blended together via medium to high intensity mixing. It is of import to note that the alkanolamine is not pre-reacted with either the epoxy resin, or the curing agent. Instead, the curing agent, epoxy resin, alkanolamine, fillers, additives, etc, are all added to the mixing container in no certain order, and mixed together.

The mixing container is suitably sized and shaped to accommodate all of the powder coating components. For example, the shape of the container can be cylindrical, square, etc., and the container can be made of any solid material that is nonreactive with the powder coating components.

The blended mixture is then melt blended in a holt melt extruder, wherein the exit temperature of the extrudate ranges from about 200° F. to about 280° F. Careful control of the extruder temperature is maintained so as to minimize any curing and gelation from taking place in the extruder. The extruded composition is then cooled, for example, on water cooled chill rollers to approximately 100° F. After cooling, the extrudate is broken into chips and ground to a powder using, for example, a Bantam grinder. The ground powder is subsequently screened to achieve the desired particle size.

In preparing the zinc borate containing powder coating composition of the present invention, a predetermined amount of the zinc borate compound may be added to the thermosetting resin, and then premixed. The premix is then heat-kneaded, cooled, and thereafter pulverized and classified.

Coating Process

The powder coating compositions of the present invention can be readily applied to rebars, pipelines and other metallic substrates in accordance with typical application methods known in the powder coating art. In general, the coating compositions of the present invention can be applied to a substrate that either has, or has not, been preheated. Typically, the powder coating is applied by standard means, such as fluidized bed immersion, electrostatic spray application, flocking, tribostatic spray application and the like.

In an embodiment of the present invention in which the substrate is not pre-heated, the coating composition of the present invention may, for example, be applied to the substrate surface by being electrostatically sprayed thereon with, for example, an electrostatic Gema gun set at a voltage of 40 KV. Prior to applying the coating composition the substrate may be grounded but not pre-heated, so that the substrate is at an ambient temperature of about 77° F. After being applied, the coating can then be cured in an oven set at 325° F. for 10 minutes. However, a person of ordinary skill in the art is familiar with the curing means that may be used in accordance with the coating compositions of the present invention. Such curing means include, for example, baking and radiation cure, such as infrared, induction and ultraviolet light. After being removed from the oven, the substrates can be air-cooled.

In an embodiment of the present invention in which the substrate is pre-heated, the coating composition of the present invention may, for example, be applied by pre-heating the substrate to a temperature ranging from about 350 to about 470° F. using means familiar to a person of ordinary skill in the art. The pre-heated substrate is then dipped in a fluidized bed containing one of the powder coating compositions of the present invention. The composition coated onto the substrate is then post-cured in an oven set at a temperature of about 510° F. for about 2 to 5 minutes. However, a person of ordinary skill in the art is familiar with the curing means that may be used in accordance with the coating compositions of the present invention. Such curing means include, for example, baking and radiation cure, such as infrared, induction and ultraviolet light.

Furthermore, the surface of the substrate to which the coating compositions of the present invention are applied, whether the substrate is, or is not, preheated, may be less than ideally prepared and the coating compositions of the present invention will still exhibit good adhesion. Substrate surfaces that have been less than ideally prepared include, for example, steel surfaces that have been blasted but not acid rinsed, pre-heated to a lower than normal application temperature, or cleaned but not chemically pre-treated. In addition, the superior adhesive properties of this invention enable the coating compositions to adhere to oily and scaly surfaces, such as those encountered with steel strappings and other marginally clean metallic substrates.

The substrate to which the powder coating compositions of the present invention are applied can be pre-heated to a temperature ranging from about 300 to about 500° F., more preferably from about 350 to about 470° F. By preheating the substrate, the residual heat in the substrate enables the powder coating composition to melt, flow and begin to cure to a continuous, anticorrosive, film. The high temperature ovens, such as convection, infrared, or combination ovens, to which the coated substrate may then be exposed further allow the coating composition to melt, flow out and cure into a smooth cured film.

The post-cure time and temperature of the compositions of the present invention range from about 2 to about 5 minutes at a temperature ranging from about 400 to about 550° F. The cure time and temperature range of the compositions of the present invention that have been applied to a substrate that has not been pre-heated ranges from about 4 to about 30 minutes at a temperature ranging from about 300 to about 450° F. After being cured/post-cured, the coated substrate is typically subjected to either air-cooling, or water quenching to lower the temperature to between about 100° F. and about 200° F.

After the coated substrate is cooled, an adhesive and/or a heavy duty protective film, such as a polyethylene lining, a polyolefin, a heavy duty protective urethane coating composition, an epoxy resin coating composition, or the like, and/or finishing layer, such as a coloring layer or another epoxy powder coating composition, may then be applied over the coating composition of he present invention. An adhesive, such as Fusabond® adhesive from DuPont, may be used to bond the protective film to the epoxy coating. The variously available adhesives, protective films and finishing layers will be familiar to a person of ordinary skill in the art.

Preferably, the substrate is coated with an effective amount of the present powder coating composition so as to produce a dry film thickness that ranges from about 1 to about 30 mils. More preferably, the substrate is coated with enough powder coating to produce a thickness that ranges from about 2 to about 18 mils. Most preferably, from about 2 to 5 mils for thin film coatings that are typically applied to a metal substrate that does not have a blast profile and is not subjected to cathodic protection, and 6 to 18 mils for thick film functional coatings applied to blasted metal that may subsequently be protected with cathodic protection. Typically, the dry film thickness will vary depending on the type of coating that is being applied. For example, when a thin film is desired, the coating composition of the present invention is applied so as to produce a coating having a thickness of about 2 to about 5 mils; when a primer coating is desired for use under protective films, the coating composition of the present invention is applied so as to produce a coating having a thickness of about 6 to about 12 mils; and when a single layer pipe coating that is going to subsequently be protected with cathodic protection is desired, the coating composition of the present invention is applied so as to produce a coating having a thickness of about 10 to about 18 mils.

Method of Cathodic Protection

The present invention also relates to a process for producing a corrosion-resistant surface on a substrate having a corrodable metal surface by coating the surface of the substrate with the coating composition of the present invention. A person of ordinary skill in the art will be familiar with the various process steps that can be utilized in producing a corrosion-resistant surface on the substrate. In one method, the surface of the substrate is subjected to a mechanical treatment, such as blasting followed by acid rinsing, or cleaning followed by chemical treatment. Next, a coating of the powder coating composition of the present invention is applied in accordance with the variously available powder coating methods, such as, for example, fluidized bed immersion, flocking, tribo spray application, or electrostatic spray application. The substrate is then polarized as a cathode. Optionally, a heavy duty protective film, such as a polyethylene lining, a heavy duty protective urethane coating composition, an epoxy resin coating composition, or the like, and/or a finishing layer, such as a coloring layer, may be applied over the coating composition of the present invention.

EXAMPLES

The present invention is further defined in the following Examples. It should be understood that these Examples are given by way of illustration only. From the above discussion and this Example, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth hereinbelow, but rather is defined by the claims contained hereinbelow.

Test Procedure

Cathodic Disbondment Test Procedure

The following cathodic disbondment test procedure was used in generating the data reported in examples 1-16. In the 48 hour tests, 88 hour tests and 28 day tests utilized in the Examples contained hereinbelow, steel panels (either 4×4× ⅝" or 4×4×¼") were first blasted to give a profile of 3-4 mils. The 4×4×⅝" panels used in the 28 day tests were then further treated by first being rinsed with phosphoric acid, and then being rinsed with de-ionized water. The respective 4×4×⅝" and/or 4×4×¼" panels used in the 48 and 88 hour tests, however, were not subjected to any further post-blasting treatments.

The respective panels utilized in each test were then coated with the compositions prepared in accordance with the Examples more clearly set forth hereinbelow. The panels subjected to the 28 day test were coated with 14-20 mils, while those subject to the 48 and 88 hour tests were coated with 13-16 mils.

Each coating was applied by pre-heating the respective panel to a temperature ranging from 350 to 470° F., and then dipping the heated panel into a fluidized bed. After a post cure of 2, 3, or 5 minutes in an oven set at 510° F., the panels were water quenched.

A 3 mm diameter hole was then drilled through the center of each coated test panel, and a 3.5 in. diameter cylinder was sealed onto the panel. The cylinder was subsequently filled with 3% NaCl solution, and a platinum wire was immersed in the solution. This entire panel-cylinder assembly was then placed in an oven set at 80° C., and a voltage of 1.5V (as measured in the solution by a Calomel electrode) was applied across the platinum wire and the test panel for 48 hours, 88 hours or 28 days. At the end of each testing period, the panel was removed from the oven, the NACL solution was poured out of the cylinder, and the cylinder was detached from the panel.

Upon removing the cylinder, 8 radial cuts away from the holiday were made in the portion of the coating within the cylinder that was in contact with the NACL coating, and the panel was left for one hour to cool to room temperature. The coating was then removed with a knife by working away from the holiday edge using a levering action. In the 28 day tests, the disbandment from the center of the holiday to edge of the disbonded area was measured, and then averaged. This method follows TransCanada Pipeline spec. TESCOAT FBE Rev.0, which is based on CSA Z245.20-98. Whereas, in the 48 hour and 88 hour tests, the disbandment from the edge of the holiday to edge of the disbonded area was measured, and then averaged. This method follows CSA Z245.20-02.

Salt Fog Test Procedure

The following salt fog testing procedure was utilized in generating the data reported in examples 17-19. Plain steel panels (5×3×0.04") that were not chemically pre-treated, were rinsed in methyl ethyl ketone and then dried. Each panel was subsequently coated with 2-3.5 mils of the individual powder coating compositions more clearly set forth in the Examples contained hereinbelow. The panels were coated by spraying the powder coating compositions onto each panel with an electrostatic Gema gun set at a voltage of 40 KV. Prior to applying the powder coating compositions, however, the panel was grounded but not heated. After electrostatically applying the powder coating compositions, the panel was baked in an oven set at 325° F. for 10 minutes, and then removed from the oven and air cooled.

After cooling, the panel was scribed with an X using a utility knife and placed in a salt fog cabinet run per ASTM B117. After 66 hours, the panel was removed. Any coating that had lost adhesion to the steel was removed by rubbing with a coin. Then the disbandment from the scribe line was measured, and then averaged.

Examples 1 to 6

Examples 2-5 of Table 1 below illustrate the alkanolamine containing thermosetting epoxy powder coating compositions of the present invention, wherein the amount of alkanolamine used is varied progressively from 0% to 1%. Example 1 is a control sample containing 0% alkanolamine. Example 6 is a comparative example that utilizes Epon® Resin DPS-2034 of Resolution Performance Products, LLC, which is a prepackaged resin that is believed to be produced by pre-reacting Tris Amino® and a bisphenol A/epichlorohydrin epoxy resin. For examples 1 to 6, the epoxy curing agent is an accelerated dicyandiamide type curing agent. All amounts are given in percent by weight of total formulation weight.

TABLE 1

Powder Coating Compositions

| Ingredient | Example 1 | Example 2 | Example 3 | Example 4 | Example 5 | Example 6 |
| --- | --- | --- | --- | --- | --- | --- |
| Epon ® Resin DPS-2034 (Resolution Performance Products, LLC)[1] | 0 | 0 | 0 | 0 | 0 | 67.5 |
| Epon ™ Resin 2024 (Resolution Performance Products, LLC)[2] | 67.5 | 67.5 | 67.5 | 67.5 | 67.5 | 0 |
| Epicure ™ Curing Agent P-104 (Resolution Performance Products, LLC)[3] | 1.7 | 1.7 | 1.7 | 1.7 | 1.7 | 1.7 |
| Modaflow ® 6000 (Solutia, Inc.)[4] | 0 | 0 | 0 | 0 | 0 | 0.5 |
| Tris Amino ® (Dow Angus)[5] | 0 | 0.1 | 0.3 | 0.6 | 1.0 | 0 |
| Nyad ™ M400 filler (NYCO Minerals, Inc.)[6] | 29.5 | 29.4 | 29.2 | 28.9 | 28.5 | 29 |
| Bayferrox ™ 140 iron oxide pigment (Bayer Corp.) | 1 | 1 | 1 | 1 | 1 | 1 |

TABLE 1-continued

Powder Coating Compositions

| Ingredient | Example 1 | Example 2 | Example 3 | Example 4 | Example 5 | Example 6 |
|---|---|---|---|---|---|---|
| Cab-o-sil ™ M5 untreated fumed silica (Cabot, Inc.) | 0.3 | 0.3 | 0.3 | 0.3 | 0.3 | 0.3 |

[1] A Bisphenol A/epichlorohydrin epoxy resin that has been reacted with tris(hydroxymethyl)aminomethane so as to incorporate the tris(hydroxymethyl)aminomethane therein.
[2] A solid bisphenol A/epichlorohydrin epoxy resin containing half a percent weight of the flow control agent, Modaflow ® (Solutia, Inc.).
[3] An accelerated dicyandiamide curing agent.
[4] A flow modifier comprising copolymerized acrylates.
[5] A tris(hydroxymethyl)aminomethane.
[6] A naturally occurring calcium metasilicate.

The ingredients comprising the example 1-6 coating compositions of Table 1 were added to a bag and mixed by agitating for approximately 3 minutes. The mixture was then poured into a hot melt extruder, wherein the exit temperature of the extrudate ranged from 220 to 260° F. After cooling on water cooled chill rollers to approximately 100° F., the extrudate was ground using a Bantam grinder so that particles having a size range of 2-100 microns with an average particle size of 40 microns were produced. Each of the thusly produced coating compositions of Table 1 were then applied to separate 4×4×¼" steel panels that had been blasted.

The process of applying the coating compositions involved heating each of the panels to a temperature ranging from 350 to 470° F. (see Table 2 to ascertain the temperature at which each of the respective coating compositions listed in Table 1 were applied), and then separately dipping each panel into a fluidized bed containing the respective powder coating composition listed in Table 1. Each of the compositions were then post-cured in an oven set at a temperature of 510° F. for 2, 3 or 5 minutes. (see Table 2) After being cure, each panel was subjected to the cathodic disbondment test described hereinabove.

As shown in Tables 1 and 2, a significant increase in adhesion, and therefore a decrease in cathodic disbondment was observed in the Example 2-5 compositions containing Tris Amino® concentrations at or above 0.1% by weight, based upon the total formulation weight of the coating composition. Surprisingly, this increase in adhesion was observed over a wide application temperature range of from 350 to 450° F.

Table 2, which contains the cathodic disbondment test results of examples 1-6, further illustrates the improved adhesion of the example 2-5 alkanolamine containing thermosetting epoxy powder coating compositions of the present invention when compared to both the Example 1 composition containing 0% alkanolamine, and the Example 6 composition containing an alkanolamine that is believed to have been pre-reacted with an epoxy resin (the prepackaged Epon® Resin DPS-2034 of Resolution Performance Products, LLC) and then subsequently added to a powder coating pre-mix. In fact, the cathodic disbondment test results for Examples 2-5 indicate that the level of cathodic disbondment decreases as the Tris Amino® concentration increases.

Figure 1:
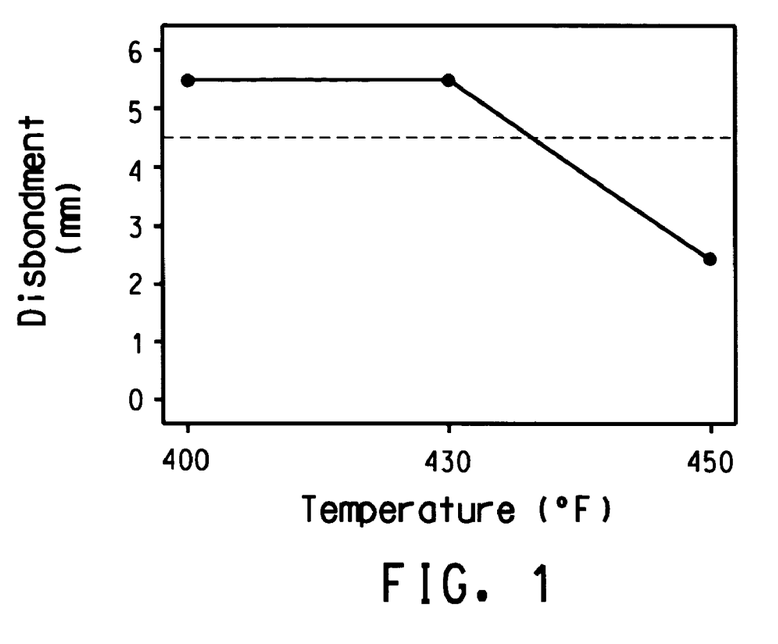
FIG. 1 is a graph illustrating the effect of application temperatures on the Example 1 Coating Compositions Containing 0% Alkanolamine.
Figure 2:
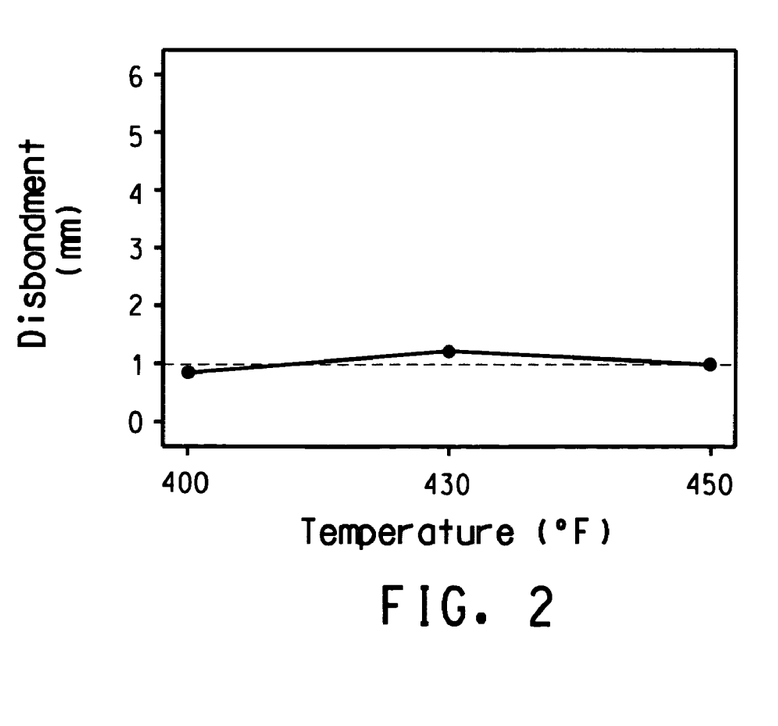
FIG. 2 is a graph illustrating the effect of application temperatures on the Example 4 Alkanolamine Containing Coating Compositions.

In addition, the FIG. 1 graph of the cathodic disbandment results obtained in Example 4 further illustrates that the temperature at which the alkanolamine containing coating compositions of the present invention are applied has virtually no affect on the level of cathodic disbandment; whereas the FIG. 2 graph of the cathodic disbandment results obtained in Example 1 indicates that the level of cathodic disbandment obtained in coating compositions containing 0% alkanolamine is directly dependent on the temperature at which the coating is applied. More specifically, the coating compositions that do not contain alkanolamine require higher application temperatures; whereas the alkanolamine containing coating compositions of the present invention have low cathodic disbandment regardless of the temperature at which the coating is applied to the substrate.

The Example 6 cathodic disbandment test results set forth in Table 2 indicate that adding Epon® Resin DPS-2034 by Resolution Performance Products, LLC, which is comprised of Tris Amino® and Bisphenol A/epichlorohydrin epoxy resin that is believed to have been pre-reacted, to additional components of a coating composition that have been pre-mixed does not produce the same favorable decrease in cathodic disbandment as is observed with those coating compositions prepared in accordance with the present invention.

TABLE 2

Cathodic Disbondment Test Results
(48 h. per CSA Z245.20-02, measured from edge of holiday)

| Application Temp. | Post Cure Time at 510° F. | Example 1 | Example 2 | Example 3 | Example 4 | Example 5 | Example 6 |
|---|---|---|---|---|---|---|---|
| 450° F. | 2 min. | 2.4 mm | 1.2 mm | 1.0 mm | <1.0 mm | <1.0 mm | 3.5 mm |
| 430° F. | 2 min. | 5.5 mm | 1.7 mm | 1.5 mm | 1.2 mm | 1.3 mm | —* |
| 400° F. | 3 min. | 5.5 mm | 1.5 mm | 1.3 mm | 0.9 mm | 0.8 mm | —* |
| 350° F. | 5 min. | 5.0 mm | —* | —* | 1.5 mm | —* | —* |

*The "—" indicates that disbondment was not tested for the respective powder coating composition at the particular temperature referenced.

Examples 7 to 11

Examples 8-11 of Table 3 illustrate the alkanolamine containing thermosetting epoxy powder coating compositions of the present invention, wherein from 1 to 3% of various alkanolamines, and mixtures thereof, are used to prepare coating compositions suitable for rebars, pipelines, and other metallic substrates. Example 7 is a control sample containing 0% alkanolamine. For examples 7 to 11, the epoxy curing agent is an accelerated dicyandiamide type curing agent. All amounts are given in percent by weight of the total powder coating formulation weight.

The powder coating compositions of Example 7 to 11 are prepared using the same process as set forth hereinabove for Examples 1-6.

TABLE 3

Powder Coating Compositions

| Ingredient | Example 7 | Example 8 | Example 9 | Example 10 | Example 11 |
|---|---|---|---|---|---|
| Epon ™ Resin 2024 (Resolution Performance Products, LLC.)[1] | 67.5 | 67.5 | 67.5 | 67.5 | 67.5 |
| Epicure ™ Curing Agent P-104 (Resolution Performance Products, LLC.)[2] | 1.7 | 1.7 | 1.7 | 1.7 | 1.7 |
| Diethanolamine (Aldrich Chemical Co., Inc.) | 0 | 0 | 1 | 0.5 | 0 |
| AMPD ™ (Dow Angus)[3] | 0 | 1 | 0 | 0 | 0 |
| Tris Amino ® (Dow Angus)[4] | 0 | 0 | 0.0 | 0.5 | 3.0 |
| Nyad ™ M400 filler (NYCO Minerals, Inc.)[5] | 29.5 | 28.5 | 28.5 | 28.5 | 26.5 |
| Bayferrox ™ 140 iron oxide pigment (Bayer Corp.) | 1 | 1 | 1 | 1 | 1 |
| Cab-o-sil ™ M5 untreated fumed silica (Cabot, Inc.) | 0.3 | 0.3 | 0.3 | 0.3 | 0.3 |

[1] A solid bisphenol A/epichlorohydrin epoxy resin containing half a percent weight of the flow control agent, Modaflow ® (Solutia, Inc.).
[2] An accelerated dicyandiamide curing agent.
[3] A 2-amino-2-methyl-1,3-propanediol.
[4] A tris(hydroxymethyl)aminomethane.
[5] A naturally occurring calcium metasilicate.

The alkanolamine containing epoxy powder coating compositions of Table 3 were coated on 4×4×¼" steel panels in accordance with the same coating process utilized in Examples 1-6, which is more fully set forth hereinabove, with the only exception being that all of the panels were pre-heated to a temperature of 450° F., and then post-cured for 2 minutes in an oven set at a temperature of 510° F. The coated panels were also subjected to the same cathodic disbondment test described hereinabove.

Table 4, which contains the cathodic disbondment test results of Examples 7-11, further illustrates via Examples 8-12 that coating compositions containing a 1 to 3% concentration of various alkanolamines, and mixtures thereof in accordance with present invention will have improved adhesion when compared to a composition, such as control Example 7, containing 0% of an alkanolamine.

TABLE 4

Cathodic Disbondment Test Results
(88 h. per CSA Z245.20-02, measured from edge of holiday)

| Application Temperature | Post Cure Time at 510° F. | Example 7 | Example 8 | Example 9 | Example 10 | Example 11 |
|---|---|---|---|---|---|---|
| 450° F. | 2 min. | 9.9 mm | 3.7 mm | 3.1 mm | 3.4 mm | 1.1 mm |

Examples 12 to 16

Examples 12-15 of Table 5 illustrate the alkanolamine containing thermosetting epoxy powder coating compositions of the present invention, wherein Tris Amino® is used to prepare coating compositions suitable for rebars, pipelines, and other metallic substrates. Example 16 is a comparative example containing 0% alkanolamine and 0% zinc borate compound.

Examples 12-15 indicate that adding other additives, such as Zinc Borate, which improves long term cathodic disbondment, and/or Durite® SD 357B (a tetraphenol ethane (also known as TPE) curing agent), which gives an increase in cross link density, to coating compositions containing Tris Amino® will not adversely affect the improved adhesion obtained with the alkanolamine containing epoxy powder coating compositions of the present invention. For examples 12-14, the epoxy curing agent is tetra phenol ethane or a mixture of tetra phenol ethane and an accelerated dicyandiamide type curing agent. For examples 15 and 16 the epoxy curing agent is an accelerated dicyandiamide type curing agent. All amounts are given in percent by weight of the total powder coating formulation weight.

The powder coating compositions of Example 12-16 are prepared using the same process as set forth hereinabove for Examples 1-6.

The Example 12-15 alkanolamine containing epoxy powder coating compositions of Table 5 were coated on either 4×4×1/4", or 4×4×5/8" steel panels in the 48 hour tests, and on the 4×4×5/8" steel panels in the 28 day tests in accordance with the same coating process utilized hereinabove in Examples 1-6, with the only exceptions being that the compositions used in the 48 hour and 28 day tests were applied at 450° F. The panels tested for 28 days were then blasted and rinsed with phosphoric acid. The coated panels were subjected to the same cathodic disbandment test described hereinabove.

The comparative Example 16 powder coating composition was coated on a 4×4×5/8" steel panel, which had been blasted and rinsed with phosphoric acid. The panels were coated with 14-18 mils of the Example 16 composition by pre-heating the panel to 470° F., and then dipping the panel in a fluidized bed. After a post cure of 3 minutes, the panels were water quenched. The steel panels coated with the Example 16 composition were then subjected to the same cathodic disbondment test set forth hereinabove.

TABLE 5

Powder Coating Compositions

| Ingredient | Example 12 | Example 13 | Example 14 | Example 15 | Example 16 |
|---|---|---|---|---|---|
| Epon ™ Resin 2024 (Resolution Performance Products, LLC)[1] | 65.15 | 66.57 | 66.35 | 66.75 | 67.5 |
| Epicure ™ Curing Agent P-101 (Resolution Performance Products, LLC)[2] | 0.8 | 0.8 | 0.8 | 0.8 | 0 |
| Epicure ™ Curing Agent P-104 (Resolution Performance Products, LLC)[3] | 0 | 0 | 0 | 0 | 1.7 |
| Dicyandiamide curing agent (SKW Trotsberg) | 0 | 0.68 | 0.575 | 0.9 | 0 |
| Durite ® SD 357B (Borden Chemicals, Inc.)[4] | 2.85 | 0.75 | 0.75 | 0 | 0 |
| Tris Amino ® (Dow Angus)[5] | 0.3 | 0.3 | 0.3 | 0.4 | 0 |
| Nyad ™ M400 filler (NYCO Minerals, Inc.)[6] | 29 | 29 | 27.625 | 27.25 | 29.5 |
| Zinc Borate (Borogard ® ZB, US Borax) | 0 | 0 | 1.7 | 2.0 | 0 |
| Bayferrox ™ 140 iron oxide pigment (Bayer Corp.) | 1 | 1 | 1 | 1 | 1 |
| Acrylonitrile/butadiene (Zealloy ® 1422, Zeon Chemical) | 0.6 | 0.6 | 0.6 | 0.6 | 0 |
| Cab-o-sil ™ M5 untreated fumed silica (Cabot, Inc.) | 0.3 | 0.3 | 0.3 | 0.3 | 0.3 |

[1] A solid bisphenol A/epichlorohydrin epoxy resin containing half a percent weight of the flow control agent, Modaflow ® (Solutia, Inc.).
[2] An imidazole adduct.
[3] An accelerated dicyandiamide curing agent.
[4] A phenol-glyoxal condensate curing agent that is also known as TPE (tetra phenol ethane).
[5] A tris(hydroxymethyl)aminomethane.
[6] A naturally occurring calcium metasilicate.

Table 6 contains the 48 hour cathodic disbondment test results of Examples 12-15. Examples 12-13 illustrate that coating compositions containing 0.3% Tris Amino® and a tetra phenol ethane curing agent will have improved adhesion when compared to a composition, such as Example 1, containing 0% of an alkanolamine.

Example 14 illustrates that coating compositions containing 0.3% Tris Amino®, 1.7% zinc borate, and a tetra phenol ethane curing agent will have improved adhesion when compared to a composition, such as Example 1, containing 0% of an alkanolamine. Example 14 further illustrates, when compared to Examples 12-13, that the improved adhesion achieved by adding an alkanolamine will not be adversely affected by adding both zinc borate and a tetra phenol ethane curing agent.

Example 15 illustrates that coating compositions containing 0.4% Tris Amino® and Zinc Borate will have improved adhesion when compared to a composition, such as example 1, containing 0% of an alkanolamine. Example 15 further illustrates, when compared to Examples 2-5, that the improved adhesion achieved by adding an alkanolamine will not be adversely affected by also adding zinc borate to the coating composition.

TABLE 6

Cathodic Disbondment Test Results
(48 h. per CSA Z245.20-02, measured from edge of holiday)

| Application Temp. | Post Cure Time at 510° F. | Example 12 (4 × 4 × 1/4") | Example 13 (4 × 4 × 1/4") | Example 14 (4 × 4 × 5/8") | Example 15 (4 × 4 × 5/8") |
|---|---|---|---|---|---|
| 450° F. | 3 min. | 1.5 mm | 1.1 mm | —* | 1.2 mm |
| 450° F. | 2 min. | —* | —* | 1.8 mm | —* |

*The "—" indicates that disbondment was not tested for the respective powder coating composition at the particular temperature referenced.

Table 7 which contains the 28 day cathodic disbondment test results of Examples 14, 15 and 16 illustrates via Examples 14 and 15 that coating compositions containing Tris Amino® and Zinc Borate will give improved performance when compared to Example 16 which contains 0% Zinc Borate and 0% Tris Amino®), even when applied at a lower application temperature.

TABLE 7

Cathodic Disbondment Test Results
(28 day per TransCanada Pipeline spec. TESCOAT FBE Rev. 0, which is based on CSA Z245.20-98, measured from center of holiday)

| Application Temp. | Post Cure Time at 510° F. | Example 14 | Example 15 | Example 16 |
|---|---|---|---|---|
| 450° F. | 2 min. | 19.4 | 17.5 | —* |
| 470° F. | 2 min. | —* | —* | 32.9 |

*The "—" indicates that disbondment was not tested for the respective powder coating composition at the particular temperature referenced.

Examples 17 to 19

Examples 17-18 of Table 8 illustrate the alkanolamine containing thermosetting epoxy powder coating compositions of the present invention, wherein a phenolic type curing agent and 1% of an alkanolamine are incorporated therein. The powder coatings of Table 5 are used to prepare a thin coating (2-3.5 mils). Example 19 is a control sample containing 0% alkanolamine. All amounts are given in percent by weight of total formulation weight.

TABLE 5

| Ingredient | Example 17 | Example 18 | Example 19 |
|---|---|---|---|
| D.E.R.™ 672U solid epoxy resin (Dow Chemical Co.)[1] | 30 | 30 | 30.3 |
| D.E.R.™ 642U solid epoxy resin (Dow Chemical Co.)[2] | 30 | 30 | 30.3 |
| D.E.H.™ 84 phenolic hardener (Dow Chemical Co.)[3] | 20 | 20 | 20.2 |
| Resiflow 200A flow agent (Estron Chemical, Inc.) | 0.9 | 0.9 | 0.9 |
| Tris Amino ® (Dow Angus)[4] | 1 | 0 | 0 |
| Diethanolamine (Aldrich Chemical Co., Inc.) | 0 | 1 | 0 |
| Huber 10 (J.M. Huber Corp.)[5] | 17 | 17 | 17.2 |

TABLE 5-continued

| Ingredient | Example 17 | Example 18 | Example 19 |
|---|---|---|---|
| Carbon Black (Raven ® 450, Columbian Chemicals) | 0.9 | 0.9 | 0.9 |
| Silica 8120 (Wacker) | 0.2 | 0.2 | 0.2 |

[1] A novolac modified high molecular weight reaction product of liquid epoxy resin and bisphenol-A.
[2] A novolac modified high molecular weight solid reaction product of liquid epoxy resin and bisphenol-A.
[3] A solid reaction product of liquid epoxy resin and bisphenol-A containing a curing accelerator.
[4] A tris(hydroxymethyl)aminomethane.
[5] Barium sulfate filler.

The ingredients comprising the example 17-19 coating compositions of Table 5 were added to a bag and mixed for approximately 3 minutes. The mixture was then poured into a hot melt extruder, wherein the exit temperature of the extrudate ranged from 220 to 260° F. After cooling on water cooled chill rollers to approximately 100° F., the extrudate was ground using a Bantam grinder so that particles having a size range of 2-100 microns with an average particle size of 40 microns were produced. Each of the thusly produced coating compositions of Table 8 were then applied to 3×5× 0.04" plain steel panels that were not chemically pre-treated.

The process of applying the coating compositions involved electrostatically spraying each of the panels, which were at a temperature of 77° F., with each of the respective coating compositions listed in Table 8. The panels were then cured in an oven set at 325° F. for 10 minutes. After being removed from the oven, the panels were air-cooled. After being cured, each panel was subjected to a short term salt fog test in accordance with ASTM B117, as described hereinabove.

Table 9, which contains the short term salt fog test results of Examples 17-19, further illustrates via Examples 17-18 that compositions containing an alkanolamine in accordance with the present invention have improved adhesion when compared to control Example 19 containing 0% alkanolamine. More specifically, the coating compositions of Examples 17-18 had less disbandment from the scribe line than the coating composition of Example 19.

Examples 17-19 further illustrate that improved adhesion can be obtained even though the coating compositions of the present invention are applied to the surface of a substrate that has been less than ideally prepared.

TABLE 9

| Salt Fog Test Results (66 h, average disbondment from scribe line) | | |
|---|---|---|
| Example 17 | Example 18 | Example 19 |
| 4 mm | 4 mm | 7 mm |

We claim:

1. An epoxy powder coating composition comprising an intimate mixture of:
   (a) about 60 to 80 wt. %, based on the total weight of the powder coating composition, of at least one epoxy resin;
   (b) about 0.02 to about 6.0 wt. %, based on total weight of the powder coating composition, of at least one alkanolamine;
   (c) at least one epoxy curing agent in an effective amount to cure said powder coating composition; and
   (d) about 1.5 to 2.5 wt. %, based on the total weight of the powder coating composition, of at least one zinc borate compound;
wherein said components (a), (b), (c) and (d) are not reacted prior to being mixed together.

2. The coating composition according to claim 1, wherein the at least one epoxy resin is selected from di-glycidyl ethers of 4,4-(bishydroxyphenyl) alkanes, phenol novolac epoxy functional resins, cresol novolac epoxy functional resins, bisphenol-A/epichlorohydrin epoxy functional resins, and mixtures thereof.

3. The coating composition according to claim 1, wherein said at least one alkanolamine comprises at least one of (i)

wherein $R_1$ is a linear or branched alkyl group of 1 to 10 carbons containing at least one primary hydroxyl group;

(ii)

wherein:
$R_1$ is a linear or branched alkyl group of 1 to 10 carbons, or a linear or branched alkyl group of 1 to 10 carbons containing at least one primary hydroxyl group; and
$R_2$ is a linear or branched alkyl group of 1 to 10 carbons containing at least one primary hydroxyl group; and
(iii) mixtures thereof.

4. The coating composition according to claim 1, wherein the at least one alkanolamine is selected from diethanolamine, ethanolamine, 2-amino-1-butanol, 2-amino-2-methyl-1-propanol, 2-amino-2-ethyl-1,3-propanediol, tris(hydroxymethyl)aminomethane, 2-amino-2-methyl-1,3-propanediol, monomethylaminoethanol, isopropylaminoethanol, t-butylaminoethanol, ethylaminoethanol, n-butylaminoethanol, isopropanolamine, diisopropanolamine, and mixtures thereof.

5. The coating composition according to claim 1, wherein the at least one alkanolamine ranges from about 0.1 to about 0.5 wt. %.

6. The coating composition according to claim 1, wherein the at least one curing agent is an epoxy curing compound selected from aromatic amines, acid anhydrides, acids, aromatic acids, mercaptans, phenolics, dicyandiamide derivatives having an addition reactivity and self-polyaddition catalytic activity, imidazoles, imidazole adducts, hydrazides, and mixtures thereof.

7. The coating composition according to claim 1, wherein said at least one zinc borate compound is selected from zinc metaborate, basic zinc borate, zinc borate, and mixtures thereof.

8. The coating composition according to claim 1, further comprising at least one filler selected from calcium oxide, calcium silicate, barium sulfate, and mixtures thereof.

9. The coating composition according to claim 1, further comprising at least one additive selected from pigments, dyes, flow control agents, dispersants, thixotropic agents, adhesion promoters, antioxidants, light stabilizers, curing catalysts, anticorrosion agents, substituted benzotriazoles, thermoplastic polymers, and mixtures thereof.

10. A method of cathodic protection for an iron containing metallic material having at least one surface, comprising:
    (a) subjecting the surface of the iron containing metallic material to a mechanical treatment, and then
    (b) applying the coating composition of claim 1 to said surface, and finally
    (c) polarizing the iron containing metallic material having the coating composition of claim 1 coated thereon as a cathode.

11. The method of cathodic protection according to claim 10, further comprising coating an adhesive and/or a heavy duty protective film and/or a finishing layer over the coating composition applied in step (b).

12. A process for coating a metal substrate comprising applying the coating composition according to claim 1 to a metal substrate and curing said coating composition.

13. The process according to claim 12, further comprising pre-heating the substrate to a temperature ranging from about 350 to about 470° F. prior to applying the coating composition of claim 1.

14. The process according to claim 12, wherein said substrate is cured at a temperature ranging from about 300 to about 450° F.

15. The process according to claim 12, further comprising coating a heavy duty protective film and/or a finishing layer over the coating composition of claim 1.

16. The process according to claim 12, wherein said substrate is a pipe having an internal and/or external surface and said coating composition is applied to the internal surface and/or the external surface.

17. A metal substrate coated with the composition according to claim 1.

18. The substrate according to claim 17, wherein said substrate is a pipe.

19. The substrate according to claim 17, wherein said substrate is a rebar.

20. An epoxy powder coating composition comprising an intimate mixture of:
   (a) about 60 to 80 wt. %, based on the total weight of the powder coating composition, of at least one solid epoxy resin;
   (b) about 0.02 to about 6.0 wt. %, based on total weight of the powder coating composition, of tris(hydroxymethyl)aminomethane;
   (c) about 1.5 to 2.5 wt. %, based upon total weight of the powder coating composition, of at least one zinc borate compound;
   (d) an effective amount of tetra phenol ethane to cure the powder coating composition; and
   (e) an effective amount of at least one catalyst;

wherein said components (a), (b), (c) and (d) are not reacted prior to being mixed together.

21. A process for making a curable epoxy powder coating composition comprising
   (a) adding about 60 to 80 wt. %, based on the total weight of the powder coating composition, of at least one epoxy resin to a mixing container;
   (b) adding about 0.02 to about 6.0 wt. %, based on total weight of the powder coating composition, of at least one alkanolamine to the mixing container;
   (c) adding about 1.5 to 2.5 wt. %, based on total weight of the powder coating composition, of at least one zinc borate compound;
   (d) adding at least one epoxy curing agent in an effective amount to cure said powder coating composition to the mixing container; and
   (e) mixing components (a), (b) (c) and (d) together,
wherein said components (a), (b), (c) and (d) are not reacted prior to being added to the mixing container.

* * * * *